United States Patent [19]

Hebert

[11] Patent Number: 5,426,694
[45] Date of Patent: Jun. 20, 1995

[54] TELECOMMUNICATION SWITCH HAVING PROGRAMMABLE NETWORK PROTOCOLS AND COMMUNICATIONS SERVICES

[75] Inventor: Mark P. Hebert, Kingston, Mass.

[73] Assignee: Excel, Inc., Sagamore Beach, Mass.

[21] Appl. No.: 134,122

[22] Filed: Oct. 8, 1993

[51] Int. Cl.⁶ .............................................. H04M 3/00
[52] U.S. Cl. .................................... 379/242; 379/93; 379/94
[58] Field of Search .................... 379/93, 94, 165, 230, 379/67, 90, 95, 96, 97, 457, 88, 242; 370/95.3

[56] References Cited

U.S. PATENT DOCUMENTS 5,260,990 11/1993 Melampy et al. ..................... 379/67

FOREIGN PATENT DOCUMENTS 0555997 8/1993 European Pat. Off. ...... H04L 29/06

OTHER PUBLICATIONS

"Flexible Protocol Stacks," Tschudin, C., *Computer Communication Review*, Sep. 1991, vol. 21, No. 4., pp. 197–205.
"Dynamic Protocol Configuration for Multimedia Networks," Stainov, R., *Microprocessing and Microprogramming*, Sep. 1993, vol. 38, No. 1/5, pp. 741–748.
"Specifying Telephone Systems in LOTOS," Boumezbeur, R. and L. Logrippo, *IEEE Communications Magazine*, Aug. 1993, vol. 31, No. 8, pp. 38–45.
Ameritec Corporation, "AM2 Bulk Call Generator—Protocol Table Development Guide," (Feb. 1991).
Ameritec Corporation, AM2-De 2.0 MB Digital Bulk Call Generator Instruction Manual," (Jan. 1992).

*Primary Examiner*—James L. Dwyer
*Assistant Examiner*—Scott Wolinsky
*Attorney, Agent, or Firm*—Cesari and McKenna

[57] ABSTRACT

A telecommunications protocol development environment which enables a user to define a separate finite state machine for each port or channel provided by a programmable telecommunications switch. Protocols for various telecommunications applications and software layers may be developed.

20 Claims, 21 Drawing Sheets

PROGRAMMABLE PNPCS FUNCTIONS PER LAYER

APPLICATION LAYER (LAYER 5)
- MATRIX/LINE CARD MANAGEMENT
  - DOWNLOAD CONTROL
  - ALARM PROCESSING
  - REDUNDANT MATRIX CONTROL
- CONFIGURATION MANAGEMENT
  - MATRIX CONFIGURATION
  - LINE CARD CONFIGURATION
- HIGH LEVEL (LAYER 5) CALL PROCESSING
  - INTERACTIVE DIGIT COLLECTION
  - RECORDED ANNOUNCEMENT CONTROL FOR INTERACTIVE VOICE RESPONSE APPLICATION SUPPORT
  - BROADCASTING/CONFERENCING CONTROL
  - INBOUND CALL ROUTING/QUEUEING
  - OUTBOUND CALL INITIATION WITH DIGIT OUTPULSING
  - ADDRESS DIGIT ROUTING TO CHANNELS/CHANNEL GROUPS
  - CALL HUNTING FOR OUTBOUND CHANNEL SELECTION
  - CALL PROGRESS TONE CONTROL FOR INBOUND/OUTBOUND CALLS
  - MULTIPLE CALL MGMT FEATURES (TRANSFER, HOLD, CONFERENCING, CALLBACK, FORWARDING, ETC.)
  - CALL DETAIL RECORDING

CALL MANAGEMENT LAYER (LAYER 4)
- INTERACTIVE RECORDED ANNOUNCEMENT CONTROL (USER DIGIT DRIVEN)
- LAYER 4/APPLICATION LAYER (LAYER 5) INITIATED CALL PARK
- 1-WAY/2-WAY/CONFERENCE CONNECTION MANAGEMENT
- RECONNECTION (TRANSFER)
- LAYER 4 OUTGOING OUTSEIZE INITIATION FOR 2-WAY CONNECTIONS
- MULTIPLE CALL MGMT FEATURES (TRANSFER, HOLD, CONFERENCING, CALLBACK, FORWARDING, ETC.)
- CUSTOMIZATION OF INSEIZE COMPLETION REPORT SENT TO THE APPLICATION LAYER (LAYER 5)

NETWORK PROTOCOL LAYER (LAYER 3)
- IN BAND LINE/ADDRESS SIGNALLING CONTROL
  - E&M INTERFACE
  - LOOPSTART, GROUNDSTART TRUNK INTERFACES
  - LOOPSTART, GROUNDSTART LINE INTERFACES
  - MULTI-WINK MFR1 FEATURE GROUP D
  - DTMF DIALED NUMBER INDENTIFICATION SERVICES (DNIS)
  - COMPELLED R2 FOR INTERNATIONAL E1 INTERFACES
  - IN BAND/EXTENDED IN BAND/MULTI-WINK COIN SIGNALLING
  - CUSTOM T1/E1 SERVICE CARD INTERFACES
- OUT OF BAND SIGNALLING CONTROL
  - ISDN PRIMARY RATE LAYER 3 Q.931
  - SS7 ISDN USER PART (ISUP)

FIG. 3A

LINK LAYER (LAYER 2)
- T1 ROBBED BIT SIGNALLING SCANNING
- E1 CHANNEL ASSOCIATED SIGNALLING SCANNING
- T1/E1 LINE INTERFACE FRAME ALARM CONTROL
- DSP TONE RECEPTION CONTROL
    IN BAND ADDRESS SIGNALLING (MFR1, MFR2, DTMF)
    CALL PROGRESS ANALYSIS
- DSP TONE GENERATION CONTROL
    IN BAND ADDRESS SIGNALLING (MFR1, MFR2, DTMF)
    CALL PROGRESS TONE GENERATION
    CUSTOM CALL PROGRESS TONE GENERATION

- DSP RECORDED VOICE ANNOUNCEMENT CONTROL
- DSP CONFERENCE GENERATION CONTROL
- GENERIC DSP FUNCTION CONTROL
    DSP PROCESSOR TO MFDSP MAIN PROCESSOR DSP CONTROL/
        INFORMATIONAL MESSAGES
    MFDSP MAIN PROCESSOR TO DSP PROCESSOR CONTROL/
        INFORMATIONAL MESSAGES
    MFDSP MAIN PROCESSOR DSP FUNCTION ANALYSIS/CONTROL

FIG. 3B

| PRIMITIVE ID | 1st ATOMIC FUNCTION | 2nd ATOMIC FUNCTION | 3rd ATOMIC FUNCTION | 4th ATOMIC FUNCTION | 5th ATOMIC FUNCTION |
|---|---|---|---|---|---|
| PRIMITIVE #1 | af2 (0x00,0x00) | af3 (0x00,0x00) | af4(0x00,0x00) | af5(0x01,0x01) | af1(0x02,0x01) |
| PRIMITIVE #2 | af5 (0x01,0x02) | af1 (0x03,0x01) | af1(0x02,0x01) | | |
| PRIMITIVE #3 | af9 (0x00,0x00) | af5 (0x01,0x01) | | | |
| PRIMITIVE #4 | af5 (0x01,0x03) | af1 (0x05,0x01) | | | |
| PRIMITIVE #5 | af10(0x00,0x00) | af11(0x00,0x00) | | | |
| PRIMITIVE #6 | af12(0x00,0x00) | | | | |
| PRIMITIVE #7 | af7 (0x00,0x00) | af8 (0x00,0x00) | af1(0x04,0x02) | | |

LAYER 2 FORWARD COMPELLED R2 PRIMITIVE TABLE

| STATE NUMBER | EVENT | PRIMITIVE ID |
|---|---|---|
| STATE 1 | L3_L2nSETUP_FOR_FWD_R2D | PRIMITIVE 1 |
| STATE 2 | DSP_L2nSILENCE_RECEIVED | PRIMITIVE 2 |
| STATE 2 | TIMER1_EXPIRATION | PRIMITIVE 5 |
| STATE 3 | DSP_L2nRCVD_R2_FWD_SIG | PRIMITIVE 7 |
| STATE 3 | L3_L2nXMIT_BWD_R2_SIG | PRIMITIVE 6 |
| STATE 3 | TIMER1_EXPIRATION | PRIMITIVE 5 |
| STATE 4 | L2_INT_EVENT_0 | PRIMITIVE 4 |
| STATE 4 | L2_INT_EVENT_1 | PRIMITIVE 3 |
| STATE 5 | L3_L2nXMIT_BWD_R2_SIG | PRIMITIVE 3 |

LAYER 2 FORWARD COMPELLED R2 STATE/EVENT TABLE

FIG. 6C

| PRIMITIVE ID | 1st ATOMIC FUNCTION | 2nd ATOMIC FUNCTION | 3rd ATOMIC FUNCTION | 4th ATOMIC FUNCTION |
|---|---|---|---|---|
| PRIMITIVE #1 | af17(0x00,0x00) | af19(0x00,0x00) | af21(0x00,0x0) | af1(0x02,0x02) |
| PRIMITIVE #2 | af30(0x00,0x00) | af1(0x03,0x02) | | |
| PRIMITIVE #3 | af22(0x91,0x00) | | | |
| PRIMITIVE #4 | af2(0x0D,0x00) | af5(0x01,0x01) | af1(0x04,0x01) | af1(0x04,0x01) |
| PRIMITIVE #5 | af31(0x00,0x00) | af2(0x0D,0x00) | af5(0x01,0x01) | |

E1 R2 PRIMITIVE TABLE

| STATE NUMBER | EVENT | PRIMITIVE ID |
|---|---|---|
| STATE 1 | RCV_LINE_SIG_0001 | PRIMITIVE 1 |
| STATE 2 | L3_INT_EVENT_0 | PRIMITIVE 3 |
| STATE 2 | L3_INT_EVENT_7 | PRIMITIVE 2 |
| STATE 3 | L3_INT_EVENT_0 | PRIMITIVE 4 |
| STATE 3 | L3_INT_EVENT_1 | PRIMITIVE 5 |

E1 R2 STATE/EVENT TABLE

FIG. 7C

| PRIMITIVE ID | 1st ATOMIC FUNCTION | 2nd ATOMIC FUNCTION | 3rd ATOMIC FUNCTION |
|---|---|---|---|
| PRIMITIVE #1 | af30(0x00,0x00) | af1(0x02,0x02) | |
| PRIMITIVE #2 | af31(0x00,0x00) | af5(0x01,0x0A) | |
| PRIMITIVE #3 | af5(0x01,0x0A) | af1(0x03,0x01) | af1(0x03,0x01) |
| PRIMITIVE #4 | af2(0x00,0x00) | af5(0x01,0x0C) | af1(0x05,0x01) |
| PRIMITIVE #5 | af2(0x03,0x00) | af5(0x01,0x0B) | af1(0x04,0x01) |

T1 E&M WINK START PRIMITIVE TABLE

| STATE NUMBER | EVENT | PRIMITIVE ID |
|---|---|---|
| STATE 1 | RCV_LINE_SIG_11 | PRIMITIVE 1 |
| STATE 2 | L3_INT_EVENT_0 | PRIMITIVE 3 |
| STATE 2 | L3_INT_EVENT_1 | PRIMITIVE 2 |
| STATE 3 | TIMER1_EXPIRATION | PRIMITIVE 5 |
| STATE 4 | TIMER1_EXPIRATION | PRIMITIVE 4 |

T1 E&M WINK START STATE/EVENT TABLE

FIG. 8C

| PRIMITIVE ID | 1st ATOMIC FUNCTION | 2nd ATOMIC FUNCTION | 3rd ATOMIC FUNCTION | 4th ATOMIC FUNCTION | 5th ATOMIC FUNCTION |
|---|---|---|---|---|---|
| PRIMITIVE #1 | af1(0x00,0x00) | af2(0x00,0x00) | af3(0x00,0x00) | af4(0x01,0x01) | af5(0x02,0x01) |
| PRIMITIVE #2 | af6(0x0A,0x00) | | | | |
| PRIMITIVE #3 | af7(0x00,0x00) | af4(0x01,0x02) | af5(0x03,0x01) | | |
| PRIMITIVE #4 | af8(0x00,0x00) | af4(0x01,0x03) | af5(0x04,0x01) | | |

LAYER 4 IVR SERVICE PRIMITIVE TABLE

| STATE NUMBER | EVENT | PRIMITIVE ID |
|---|---|---|
| STATE 1 | L3_SETUP_INDICATION | PRIMITIVE 1 |
| STATE 2 | DSP_RESOURCE_ALLOC | PRIMITIVE 3 |
| STATE 2 | TIMER1_EXPIRATION | PRIMITIVE 2 |
| STATE 3 | DSP_DIGITS_RECEIVED | PRIMITIVE 4 |
| STATE 3 | TIMER1_EXPIRATION | PRIMITIVE 3 |

LAYER 4 IVR STATE/EVENT TABLE

FIG. 9C

| PRIMITIVE ID | 1st ATOMIC FUNCTION | 2nd ATOMIC FUNCTION | 3rd ATOMIC FUNCTION | 4th ATOMIC FUNCTION |
|---|---|---|---|---|
| PRIMITIVE #1 | af1(0x00,0x00) | af2(0x00,0x00) | af4(0x01,0x01) | af5(0x02,0x01) |
| PRIMITIVE #2 | af3(0x00,0x00) | af5(0x01,0x01) | | |
| PRIMITIVE #3 | af9(0x03,0x00) | af4(0x01,0x05) | af5(0x03,0x01) | |
| PRIMITIVE #4 | af8(0x00,0x00) | | | |
| PRIMITIVE #5 | af7(0x00,0x00) | af4(0x01,0x03) | af5(0x04,0x01) | |
| PRIMITIVE #6 | af6(0x01,0x00) | af4(0x02,0x01) | | |
| PRIMITIVE #7 | af6(0x02,0x00) | af7(0x00,0x00) | af4(0x01,0x03) | af5(0x04,0x01) |
| PRIMITIVE #8 | af6(0x01,0x00) | af5(0x05,0x01) | | |

LAYER 5 INBOUND APPLICATION PRIMITIVE TABLE

| STATE NUMBER | EVENT | PRIMITIVE ID |
|---|---|---|
| STATE 1 | L4_RFS_WITH_DIGITS | PRIMITIVE 1 |
| STATE 2 | RT_L5nCONNECT_TO_B | PRIMITIVE 5 |
| STATE 2 | RT_L5nQUEUED_TO_GROUP | PRIMITIVE 3 |
| STATE 2 | TIMER1_EXPIRATION | PRIMITIVE 4 |
| STATE 3 | L4_L5nCONNECT_ANN_ACK | PRIMITIVE 6 |
| STATE 3 | RT_L5nCONNECT_TO_B | PRIMITIVE 7 |
| STATE 3 | TIMER1_EXPIRATION | PRIMITIVE 4 |
| STATE 3 | TIMER2_EXPIRATION | PRIMITIVE 3 |
| STATE 4 | L4_L5nCONNECT_ACK | PRIMITIVE 8 |
| STATE 4 | TIMER1_EXPIRATION | PRIMITIVE 4 |
| STATE 5 | L4_L5nCHANNEL_RELEASED | PRIMITIVE 2 |

LAYER 5 INBOUND STATE/EVENT TABLE

FIG. 10C

TELECOMMUNICATION SWITCH HAVING PROGRAMMABLE NETWORK PROTOCOLS AND COMMUNICATIONS SERVICES

BACKGROUND OF THE INVENTION

1. Field of the Invention

The present invention relates generally to the field of telecommunications and, more specifically, to programmable telecommunication switches and controlling external computers supporting various telecommunications applications.

2. Discussion of the Prior Art

Programmable telecommunication switches are used in a wide variety of applications such as voice messaging, telemarketing services and the like. A programmable switch is usually controlled by a host device, which is typically a computer that runs a telecommunications application program. A customer may either purchase a commercially available application program that is compatible with the host and switch hardware or may elect to write a custom program.

In most applications, a programmable switch is connected to a public telephone network by one or more analog trunks or digital spans (e.g., a T1 span) which are terminated at the switch. The switch may also terminate one or more "lines" which are connected to devices such as telephone sets. Communication over any given trunk, span or line is carried out in accordance with an assigned signalling protocol.

Throughout the world, there are numerous "standard" signalling protocols in use. Some protocols which are widely used at present are E&M wink start, loopstart, groundstart and international compelled R2 using DTMF/MFR1 or MFR2 address signalling.

In conventional programmable switches, the selection of which signalling protocol is used with respect to a particular trunk, span or line is generally made before the equipment is delivered to the customer. That is, the switch manufacturer configures the switch, which may involve aspects of hardware or firmware or both, usually in a manner which cannot easily or quickly be changed (i.e., through firmware stored in a PROM). The manufacturer's configuration effectively assigns a particular signalling protocol for each trunk, span or line.

Several problems arise, however, with such conventional configuration. First, there is the lack of flexibility for a user to configure the switch as desired for a particular application. This is especially problematic where a need arises to customize, even infrequently, the specified signalling protocols after initial installation of the switch.

Another problem with conventional programmable switches relates to their inability to dynamically change the signalling protocol specified for a particular trunk, span or line. This problem may occur with some frequency in Europe where different compelled R2 signalling protocols are used in different countries or in any country where internationally originated calls are being generated through a tandem switching arrangement. The undesirable result is that the switch will probably not be able to properly handle the incoming call.

Another major disadvantage of conventional programmable switches is that they offer no capability for the user to easily develop and implement custom signalling protocols for applications. Custom protocols may be desirable, if not necessary, in applications where the switch is connected between the public telephone network and other devices (e.g., a voice messaging system). Because such devices may perform specialized functions and are not intended to connect directly to the public telephone network, they do not typically adhere to standard signalling protocols. Thus, there is a need for the user to be able to control the programmable switch in such a fashion that proper communication is maintained both with the public telephone network and with other devices connected to the switch.

Yet another disadvantage of conventional programmable switches is that they require excessively frequent intervention by the host device in order to process calls. For example, in a conventional switch, host intervention (i.e., an exchange of messages between the switch and host device) is typically required to either transmit or receive digits. This is necessary because the host device must instruct the switch to apply appropriate, available resources for the task at hand. In this example, the host might instruct the switch to connect an available tone generator to a particular channel to send digits, or connect a tone receiver to receive digits. In the context of an application where hundreds to possibly tens of thousands of calls per hour are processed by a switch, the number of messages that must be passed between the host and switch becomes quite large, which often results in reduced host and switch performance.

SUMMARY OF THE INVENTION

In brief summary, the present invention provides a programmable telecommunication switch which provides a user with the ability to define and assign on a port-by-port basis a desired signalling protocol, either "standard" or custom in nature, for handling either incoming or outgoing calls. Multiple signalling protocols may be simultaneously resident in the switch and the protocol assignment of a given port may be dynamically changed in real time.

The invention provides a protocol development environment which enables the user to define a separate finite state machine for each port or channel provided by the switch. Each finite state machine may be independently defined by combining a series of elementary processing steps, called atomic functions, into primitives, which are in turn combined with states and events to define the desired state machine. Such state machines may include wait states, which are preferably used to reduce the involvement of the host device in processing calls. Wait states may represent programmable timed periods which provide an opportunity for expected actions or events to occur before the switch performs the next operation.

In addition, the present invention may serve as a development tool for telecommunications applications such as personal communications services (PCS), 800/900 service, voice mail, telemarketing, among others. The present invention may also be used to control or manage a wide variety of communications services within a programmable switch, including conferencing, voice recorded announcements, tone generation, tone reception, call progress analysis, voice recognition, voice compression and fax encoding/decoding.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A and 3B depict some of the specific features and functions associated with each of the software layers 2-5 depicted in FIG. 2;

FIG. 6C is a group of tables which show the correspondence between the atomic functions, primitives and states of FIG. 6B;

FIG. 7C is a group of tables which show the correspondence between the atomic functions, primitives and states of FIG. 7B;

FIG. 8C is a group of tables which show the correspondence between the atomic functions, primitives and states of FIG. 8B;

FIG. 9C is a group of tables which show the correspondence between the atomic functions, primitives and states of FIGS. 9B;

FIG. 10C is a group of tables which show the correspondence between the atomic functions, primitives and states of FIG. 10B.

DETAILED DESCRIPTION OF AN ILLUSTRATIVE EMBODIMENT

Figure 1:
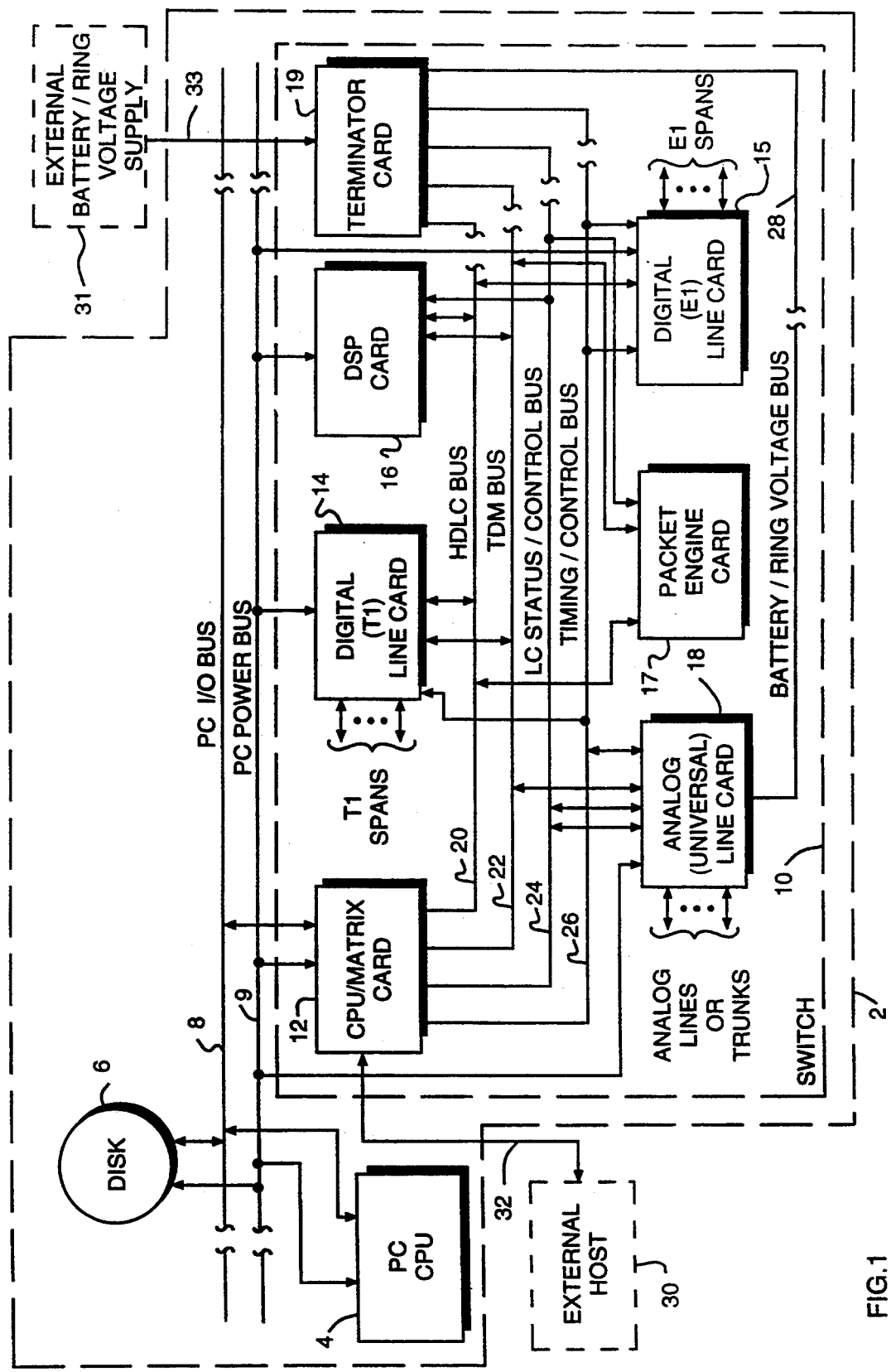
FIG. 1 is a block diagram of a programmable telecommunications switch which may be programmed by a user in accordance with a preferred embodiment of the present invention.

FIG. 1 shows a commercially available personal computer (PC) 2 which includes a PC central processing unit (CPU) 4 and a hard disk drive 6 interconnected by a PC input/output (I/O) bus 8 and a PC power bus 9. The PC 2 is preferably a PC-AT ®, sold by International Business Machines, or a compatible thereof. Other personal computers having more memory or more powerful CPUs than the PC-AT ® may also be used. The PC 2 preferably operates under an application-oriented operating system, such as DOS ® or UNIX ®.

The PC 2 consists of a chassis or housing in which a motherboard is mounted, along with the disk drive 6 and other optional assemblies such as floppy disk drives, modems and the like. The PC CPU 4 is mounted on the motherboard, which includes a series of edge connectors into which other boards (cards) may be inserted and thereby connected to the PC I/O and power busses 8 and 9.

A programmable telecommunication switch 10 resides within the PC 2. A CPU/matrix card 12 is inserted into one of the slots on the motherboard and thus connected to the busses 8 and 9. The CPU/matrix card 12 is interconnected with a digital (T1) line card 14, a digital (E1) line card 15, a digital signal processing (DSP) card 16, a packet engine card 17, an analog (universal) line card 18 and a terminator card 19 by four busses: an HDLC or interprocessor bus 20; a TDM bus 22; a line card (LC) status/control bus 24; and a timing/control bus 26. A battery/ring voltage bus 28 supplies battery voltage (48 VDC) and ringing voltage (109 VAC) to the analog line card 18. The terminator card 19 serves to physically terminate busses 20, 22, 24, 26 and 28.

The line cards 14, 15 and 18 and the DSP card 16 are all connected to and receive their basic operating power from the PC power bus 9. Although only one digital (T1) line card 14, one digital (E1) line card 15 and one analog line card 18 are depicted, it should be understood that additional line cards of any type may be added subject to two physical limitations: (1) the maximum switching capacity of the CPU/matrix card 12, and (2) the physical space within the chassis of the PC 2.

An external host 30, which may comprise a separate personal computer, workstation or other computer, may optionally be connected via a communication channel 32 to the CPU/matrix card 12. The CPU/matrix card 12 preferably includes a conventional RS-232 compatible interface for connecting the channel 32. The external host 30 preferably operates under an application-oriented operating system.

If desired, the switch 10 can reside on a passive backplane (no PC CPU 4 or disk 6 present) from which its receives electrical power and be controlled by the external host 30.

An external battery/ring voltage supply 31 is connected via a path 33 to the terminator card 19. Supply 31 may comprise, for example, a commercially available power supply.

With the exception of the digital (E1) line card 15, the DSP card 16 and the packet engine card 17, details regarding the construction of the various cards shown in FIG. 1 are set forth in copending application Ser. No. 07/953,690, filed Sep. 29, 1992, now issued as U.S. Pat.

No. 5,321,744, assigned to the assignee of the present application and which is hereby incorporated by reference. Digital (E1) line card 15 is preferably constructed using similar hardware to that disclosed for T1 line card 14, except for differences in conventional circuitry which allow line card 15 to terminate E1 spans as opposed to T1 spans.

Details regarding the construction of the DSP card 16 and the packet engine card 17 are set forth in copending application Ser. No. 08/001,113, filed Jan. 5, 1993, assigned to the assignee of the present application and which is hereby incorporated by reference.

Figure 2:
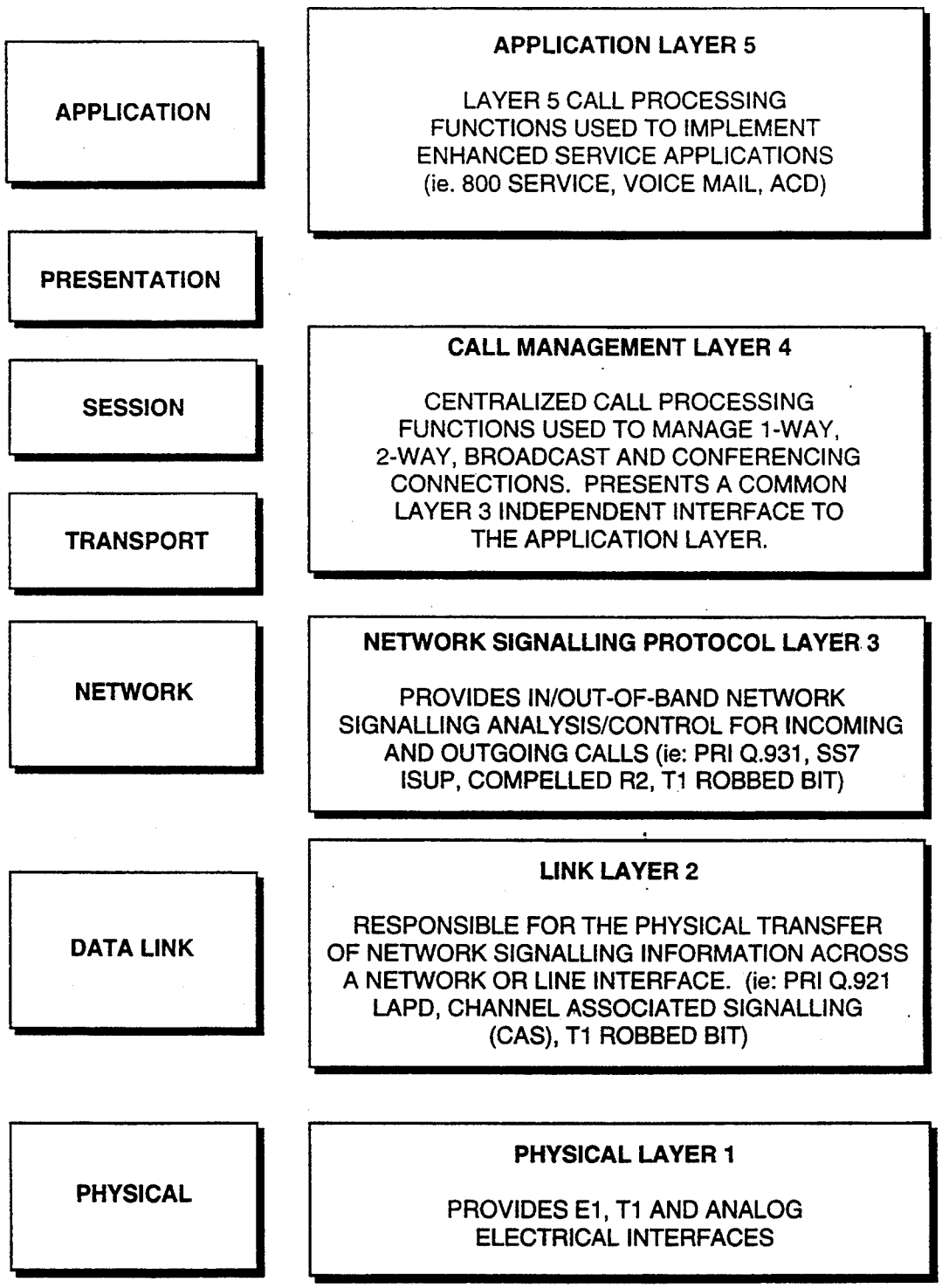
FIG. 2 is diagram which depicts the layers of software used to control the switch of FIG. 1.

FIG. 2 is a layer model of the software used to control the programmable switch 10 of FIG. 1. The lefthand column of FIG. 2 shows seven layers defined in the Open Systems Interconnection (OSI) reference model. The righthand column of FIG. 2 shows five layers used to control switch 10 and their general correspondence to the OSI model.

Referring now to both FIGS. 1 and 2, the Application Layer 5, which corresponds generally with the Application layer of the OSI model, represents application software which typically runs on either the PC CPU 4 or the external host 30. Application Layer 5 software may be used to implement any of a number of desired telecommunications services such as toll free (800) service, voice mail, automatic call distribution (ACD), to name but a few.

Call Management Layer 4, which corresponds generally with the Presentation, Session and Transport layers of the OSI model, represents software which runs on the CPU/matrix card 12. Call Management Layer 4 is responsible for performing centralized call processing functions and providing a common interface to Application Layer 5 regardless of the type or types of network signalling protocols which may be used within the switch 10. Typically, Call Management Layer 4 performs functions which are required following call setup.

Network Signalling Protocol Layer 3 corresponds generally with the Network layer of the OSI model. The software represented by Network Signalling Protocol Layer 3 runs either on the CPU/matrix card 12 or on line cards which include their own microprocessors, such as line cards 14 or 15 or packet engine card 17, and is responsible for in and out-of-band network signalling supervision as well as network protocol level control of incoming and outgoing calls.

Link Layer 2 corresponds generally with the Data Link layer of the OSI model. Link Layer 2 software runs on the CPU/matrix card 12, the line cards which include their own microprocessors, the DSP card 16 or the packet engine card 17 (each of which includes its own microprocessor) and is responsible for the detection as well as physical transfer of network signalling information across a network or line interface.

Finally, the Physical Layer 1 corresponds to the Physical layer of the OSI model. Line cards 14, 15 and 18 provide physical T1, E1 and analog electrical interfaces, respectively, to the switch 10.

FIGS. 3A and 3B are a tabular listing of representative features and functions provided by each of the software Layers 2-5 of FIG. 2. The present invention may be used as a development tool to develop suitable software to implement any of the features and functions shown in FIGS. 3A and 3B. An illustrative example of the use of the present invention in the context of each of Layers 2-5 is described below in connection with FIGS. 6A-10C.

Figure 4:
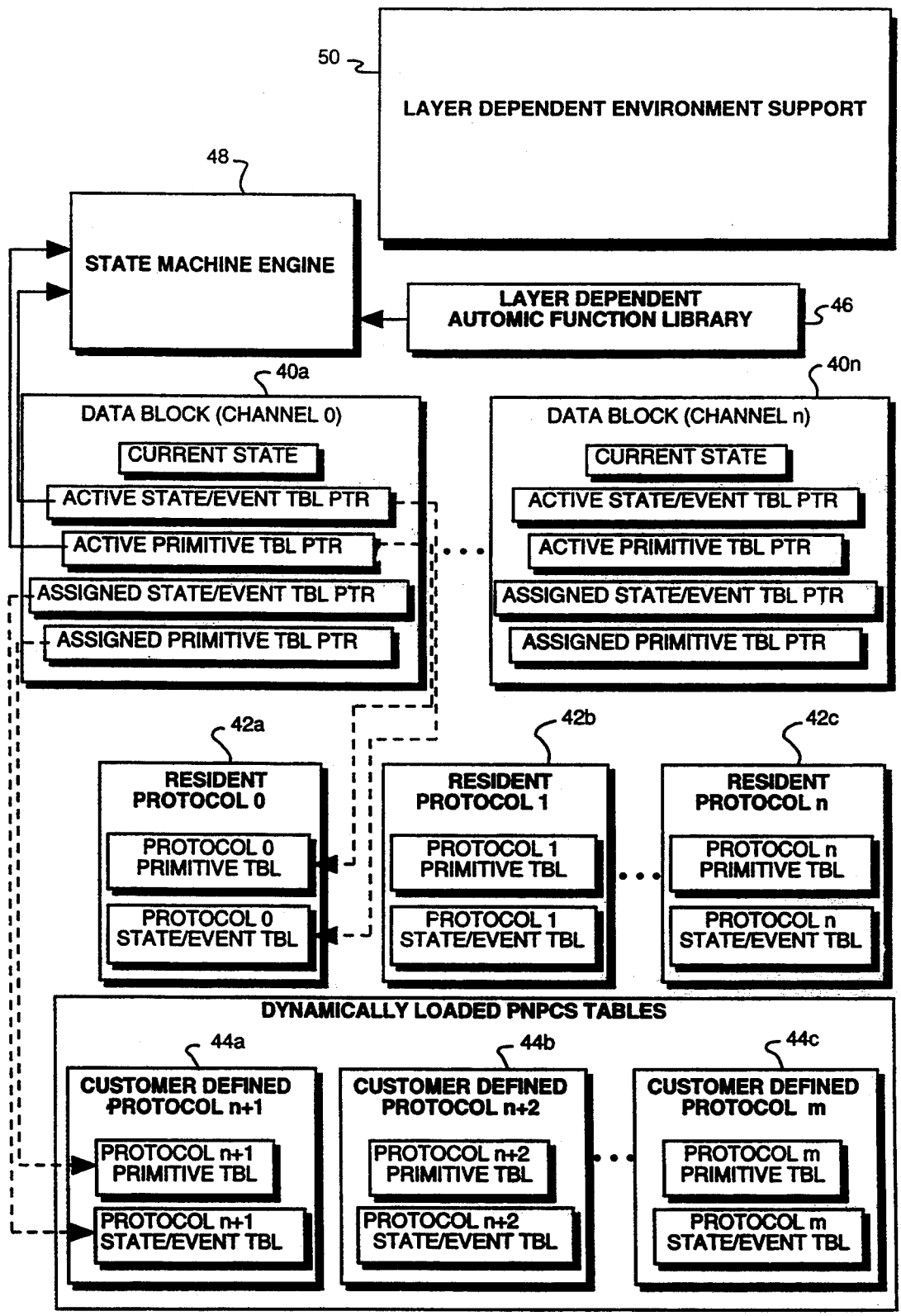
FIG. 4 is a block diagram of a finite state machine development environment constructed in accordance with a preferred embodiment of the present invention.

FIG. 4 is an overall block diagram of a finite state machine development environment, constructed in accordance with a preferred embodiment of the present invention, which enables a customer or user to create and define finite state machines for performing desired telecommunications functions. Before considering this Figure in detail, the definitions of certain terms should be addressed.

As used herein, the term state refers to a number which represents the current "context" for a particular channel or port. In a preferred embodiment of the present invention, there are three types of states defined: normal, internal and blocking. Normal states can be wait states (i.e., a SEIZE ACK state, a condition in which further action is suspended until the occurrence of a particular event) or stable states (i.e., a conversation is taking place). Internal states are used to test conditions and effectively operate as decision branches. Normal and internal states may be specified by a customer or user, in accordance with present invention, to define a finite state machine for performing a desired function. Blocking states are generated automatically by the present invention and are used, on a channel-by-channel basis, in connection with the management of off-board resources.

An event is a number which identifies a condition which is accepted by a particular state. Data may be associated with an event.

An atomic function is one which performs an elementary task such as setting a timer. User-specified data may be associated with an atomic function. A primitive is a predetermined sequence of atomic functions which is invoked upon the occurrence of a particular event. Users may create or define primitives from a library of available atomic functions. In a preferred embodiment, each primitive may contain up to 20 atomic functions.

A state/event table defines the valid events for a particular state and the primitive which is invoked upon the occurrence of each such event. In a preferred embodiment, a state/event table may contain up to 100 states and up to 40 events per state.

A primitive table defines the primitives which are used by a state/event table. In a preferred embodiment, a primitive table may contain up to 200 primitives.

A protocol is defined as the association of a state/event table with a primitive table and is identified by a protocol ID (a number).

A data block, such as those denoted by reference numbers 40a, 40n, is assigned for each channel (port) 0 ... n of the switch. Each data block 40a, 40n contains the following information pertaining to its respective channel: the current state of the channel; a pointer to an active state/event table; a pointer to an active primitive table; a pointer to an assigned state/event table; and a pointer to an assigned primitive table.

In the case of channel 0, the active state/event table and active primitive table pointers are pointing, as indicated by the phantom lines, to tables which are associated with a resident protocol 0, denoted by reference number 42a. The assigned state/event table and assigned primitive table pointers for channel 0 are pointing to tables which are associated with a dynamically loaded, customer-defined protocol n+1, denoted by reference number 44a.

Other protocols which are present and available for use are resident protocols 1 ... n (42b, 42c) and downloaded, customer-defined protocols n+2 ... m (44b, 44c). The resident protocols 42a-42c represent preprogrammed or "standard" protocols, which are typically provided by a manufacturer with a switch. In contrast, the customer-defined protocols 44a–44c are created by a customer or user and may be completely "custom" or "proprietary" in nature.

A layer dependent atomic function library 46 is connected to provide information to a state machine engine 48. State machine engine 48 is also connected to receive the active state/event table pointer and active primitive table pointer from each of data blocks 40a–40n.

Also, as denoted by reference number 50, utilities are provided for layer dependent environment support.

The function of the state machine engine 48 is to drive each channel in accordance with its assigned protocol, which is defined by the assigned state/event table and assigned primitive table. Upon the occurrence of a valid event for a normal state, a primitive is invoked in accordance with the entries in the assigned state/event table. The state machine engine 48 uses the atomic function library 46 to perform the atomic functions represented by the invoked primitive.

The state machine engine 48 will drive through any necessary internal states, automatically generating appropriate blocking states, until the channel once again reaches a normal state. At that time, processing by the state machine engine 48 is complete until the occurrence of another valid event.

Each channel is initially assigned one of the customer-defined protocols or one of the preprogrammed protocols. This is accomplished by the transmission of a message from the Application Layer 5 to the Call Management Layer 4, which in turn issues an appropriate message to Layer 3. The assigned state/event table pointer and assigned primitive table pointer point to the protocol which was last assigned. Thus, a customer may assign a desired one of the available protocols by simply specifying the protocol ID. In this fashion, the present invention advantageously permits the customer to assign, on a channel-by-channel basis, a desired protocol from among multiple protocols resident within a single switch.

Alternatively, or if the customer elects not to assign protocols to some or all of the channels, default values are preferably provided so that each channel always has a valid protocol (e.g., one of the resident protocols 42a–42c) assigned to it.

The active state/event table and active primitive table pointers, which are provided to the state engine machine 48, point to the protocol (active) which is currently controlling the channel.

The active protocol used by to a particular channel is not necessarily permanent and may be dynamically changed in real time in response to the occurrence of a specified event, as described in detail in connection with FIG. 5. Further, because the atomic functions provided by the library 46 represent elementary functions, customers or users are advantageously able to implement desired changes in protocols without substantial, or possibly any, changes to the underlying code. In addition, the environment support utilities are provided to simplify protocol development for the customer or user. The utilities provide ready-to-use resource management functions (e.g., timers) which greatly simplify the state machine logic required to implement desired protocols. Different utilities are preferably provided for each software layer since the resources required by each layer may be different.

Figure 5:
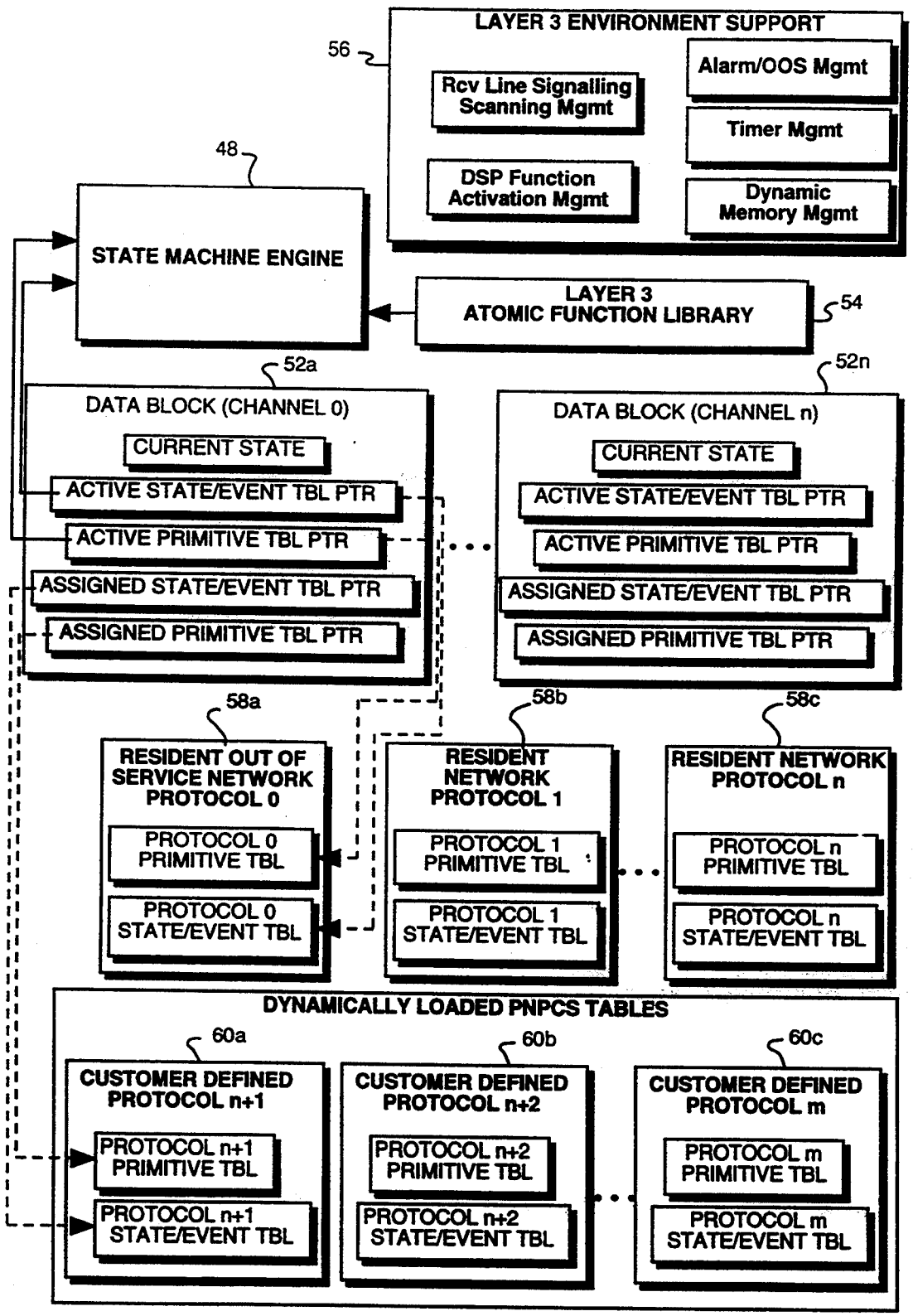
FIG. 5 is a block diagram of a layer 3 (network layer) application in which finite state machines are used to assign desired network signalling protocols to various ports of a programmable switch.

FIG. 5 is a software diagram showing a representative use of the present invention in the context of the Network Signalling Protocol Layer 3. As mentioned above, Layer 3 software typically runs on either the CPU/matrix card 12, line cards 14 or 15 or packet engine card 17 of switch 2 (FIG. 1).

Data blocks 52a, 52n are assigned to each channel of the switch. In the case of channel 0, the active state/event table and active primitive table pointers are pointing, as indicated by the phantom lines, to tables which are associated with a resident out of service protocol 58a. The assigned state/event table and assigned primitive table pointers for channel 0 are pointing to tables which are associated with a downloaded, customer-defined network protocol n+1, denoted by reference number 60a.

Other protocols which are present and available for use are resident network protocols 58b, 58c and downloaded, customer-defined network protocol 60b, 60c.

A layer 3 atomic function library 54 is connected to provide information to the state machine engine 48.

The Layer 3 environment support utilities 56 include: receive line signalling/scanning management; digital signal processing (DSP) function activation/management; alarm/out-of-service (OOS) management; timer management; and dynamic memory management.

The active state/event table and active primitive table pointers, which are provided to the state engine machine 48, point to the protocol which is currently controlling the channel. Under normal operating conditions, the active protocol will be the same as the assigned protocol. However, in this figure, the active protocol is the out of service network protocol 0. This may have occurred, for example, because an alarm condition was detected on channel 0 and the channel automatically transitioned to the out of service network protocol 0.

The protocol active used by to a particular channel is not necessarily permanent and may be dynamically changed in real time in response to the occurrence of a specified event. For example, as shown in FIG. 5, the assigned state/event table and assigned primitive table pointers for channel 0 are pointing to customer-defined network protocol 1 (60a). Assume that an incoming call is received on channel 0, but that the network signalling protocol of the incoming call is different than that of customer-defined network protocol 1 (60a). At this point, a message may be sent from Layer 3 to Layer 4 indicating that a change in the active protocol is needed in order to properly process the incoming call. In response, Layer 4 may simply reply with a message to Layer 3 to change the active protocol and proceed to process the incoming call, or may issue a message to Application Layer 5 to request instructions. Once the incoming call is terminated, the channel may be reassigned its original protocol (or any other which is available within the switch) through a similar series of messages or by an atomic function in the active protocol.

A similar function may be performed in the case of an outgoing call. That is, if an available channel needed for an outgoing call is assigned a protocol which is not appropriate for the intended call (i.e., the dialed digits indicate that the call is destined for a foreign country which uses a different protocol), then the available channel's protocol may be dynamically changed by an appropriate message from Layer 4. Again, once the call is terminated, the channel may be reassigned its original or a different protocol as desired.

Figure 6A:
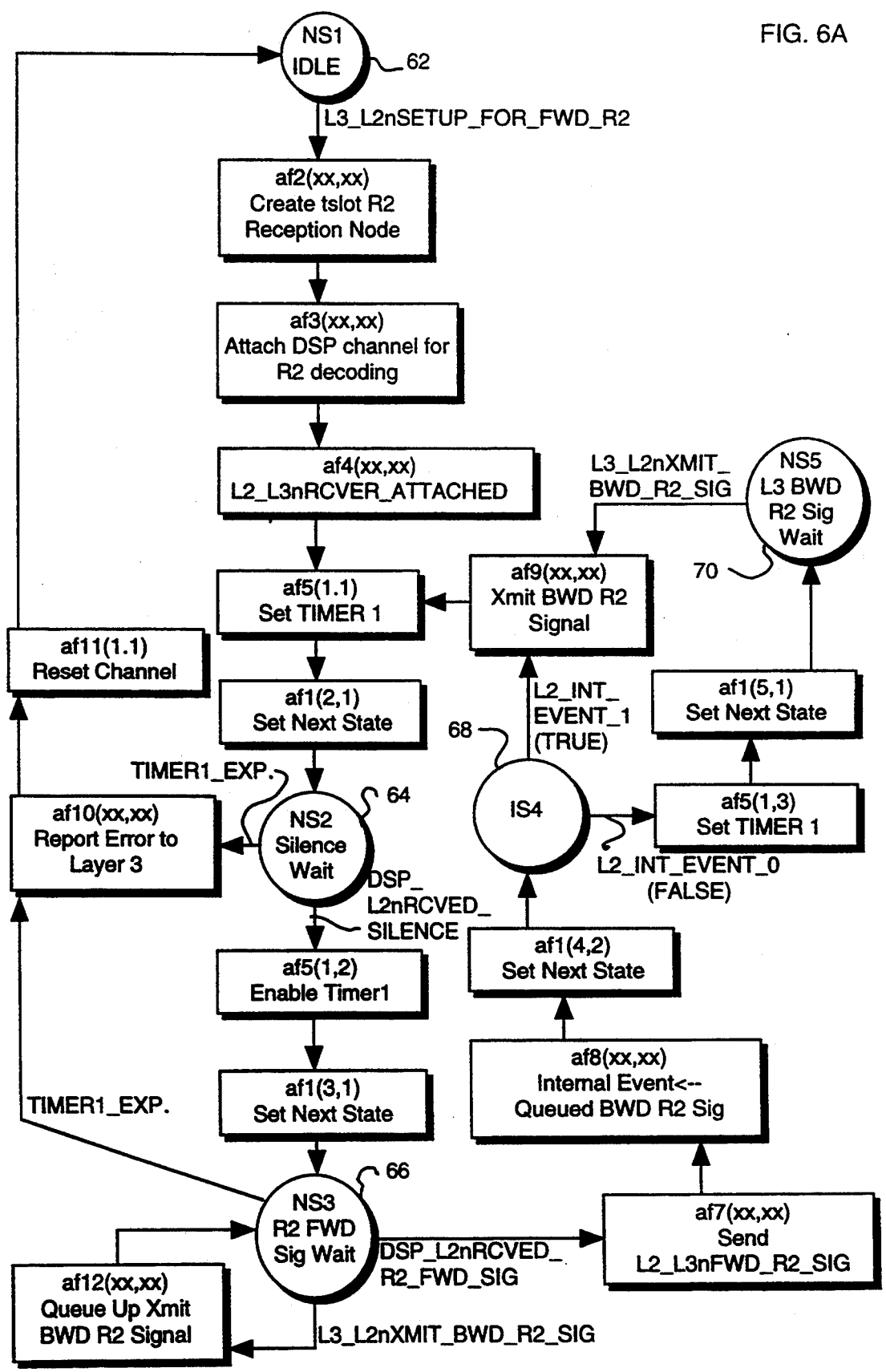
FIG. 6A is a state diagram of a finite state machine for providing tone control in link layer 2 (link layer) application.

In FIG. 6A and those which follow, a state is depicted as a circle, an atomic function is depicted as a rectangular box, and an event is represented by a word abbreviation located along a path leading out of a state. Information shown in parentheses in an atomic function represents arguments or data that are associated with that function.

Figure 6B:
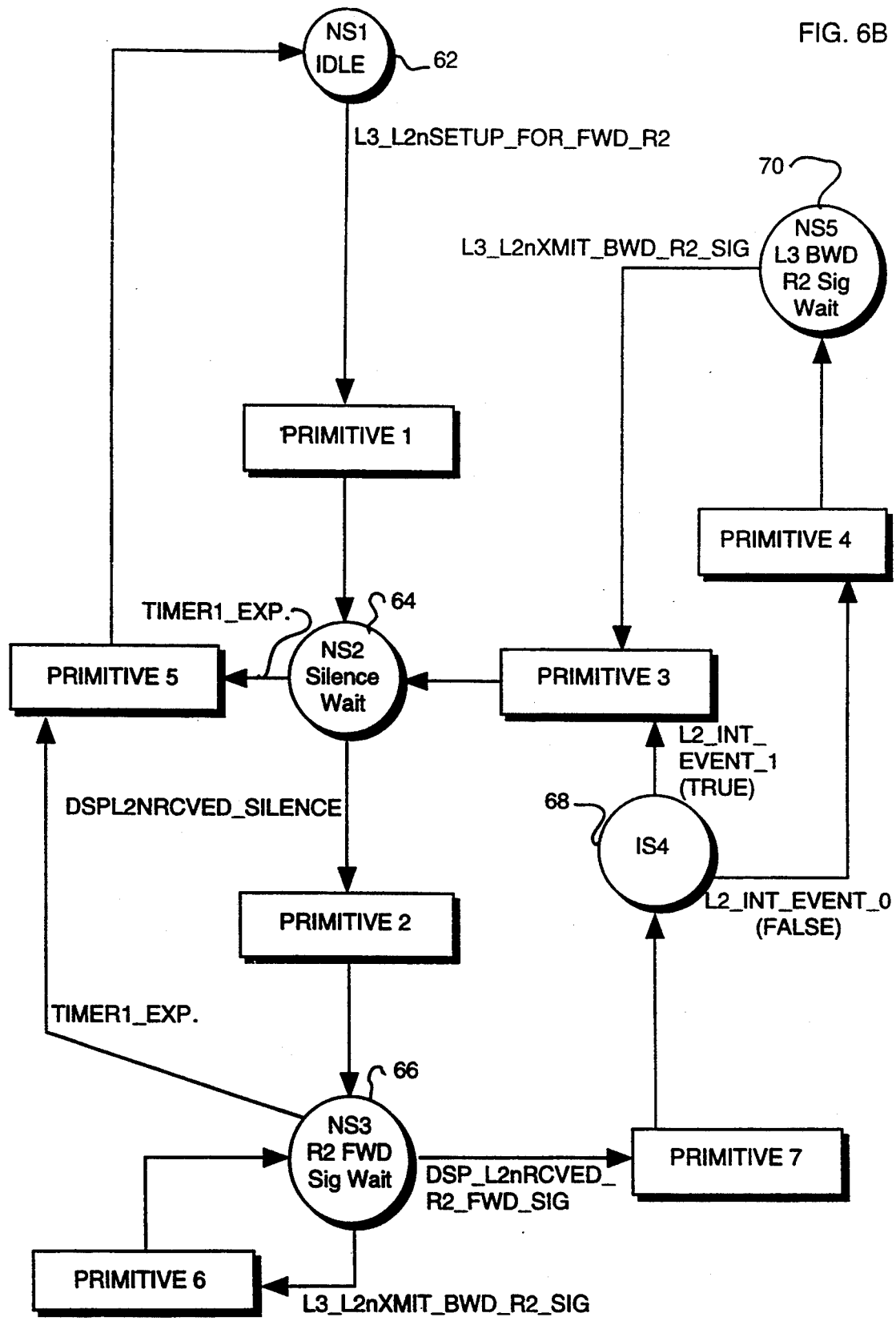
FIG. 6B is a diagram of the finite state machine of FIG. 6A in which each series of atomic functions is defined as a primitive.

FIGS. 6A-6C are an example of the application of the present invention in the context of Link Layer 2.

The protocol begins with the associated channel in normal state 1 (NS1), which is the IDLE state 62. Upon the occurrence of the event of layer 2 setup for forward R2 signalling (L3_L2n SETUP_FOR_FWD_R2), a series of atomic functions are performed (af2, af3, af4, af5 and af1). Those atomic functions operate, respectively, to create an R2 reception node for a time slot, attach a DSP channel (e.g., a DSP chip acting as a tone receiver) for R2 decoding, send a layer 2 to layer 3 receiver attached message (L2_L3nRCVR_ATTACHED), set a timer (timer 1) and then set the next state to normal state 2 (NS2) 64. Note that the arguments associated with atomic function af5 are preferably used to specify a desired timer ID and an index into an array of predetermined timer values. The arguments associated with atomic function af1 are preferably used to specify the number of the next state and the type of the next state.

If the next event is the expiration of timer 1 (TIMER-1_EXPIRATION), then atomic functions af10 and af11 are performed and the channel is returned to the IDLE state 62. However, if the next event is the receipt of a message from a DSP indicating silence was received (DSP_L2n_RCVED_SILENCE), then atomic functions af5 (setting timer 1) and af1 (setting the next state) are performed, after which the protocol advances to normal state 3 (NS3) 66 in which it waits for R2 forward signals.

If the next event is the expiration of timer 1 (TIMER1 EXPIRATION), then atomic functions af10 and af11 are performed and the channel is returned to the IDLE state 62. If the next event is the receipt of a message to transmit backward R2 signals (L3_L2n_XMIT_BWD_R2_SIG), atomic function af12 is performed, which queues the backward R2 signals for later transmission, followed by a return to NS3 66. If the next event is a message indicating the receipt of forward R2 signals (DSP_L2n_RCVED_R2_FWD_SIG), the atomic functions af7 (sending a report of the R2 signal to Layer 3), af8 (test whether backward R2 signal is queued for transmission) and af1 (set next state) are performed and the protocol advances to internal state 4 (IS4) 68.

If the next event is a true internal event (L2_INT_EVENT_1) which indicates the backward R2 signal is queued, atomic function af9 (transmitting the queued backward R2 signal) is performed, followed by af5, af1 and the protocol returns to state 64. If the next event is a false internal event (L2_INT_EVENT_0) which indicates the backward R2 signal is not queued, atomic function af5 (setting timer 1) is performed, followed by af1 (setting the next state) and the protocol advances to normal state 5 (NS5) 70. Upon the receipt of a message to transmit backward R2 signals (L3_L2n_XMIT_BWD_R2_SIG), atomic functions af9, af5 and af1 are performed and the protocol returns to state 64.

Referring now to FIG. 6B, it may be seen that the each sequence of atomic functions shown in FIG. 6A has been defined as a primitive (primitives 1-7). In effect, each primitive provides a shorthand way to identify a desired sequence of atomic functions to invoke.

FIG. 6C shows a primitive table which lists in tabular format the sequence of atomic functions for each primitive in FIG. 6B, as well as a state/event table that defines the relationships between the states, events and primitives of FIG. 6B. In accordance with a preferred embodiment of the present invention, a customer wishing to create the protocol depicted in FIGS. 6A and 6B, would need only define the tables shown in FIG. 6C. Those tables would then be downloaded to the switch 2 (FIG. 1) through a series of messages from the host device.

Figure 7A:
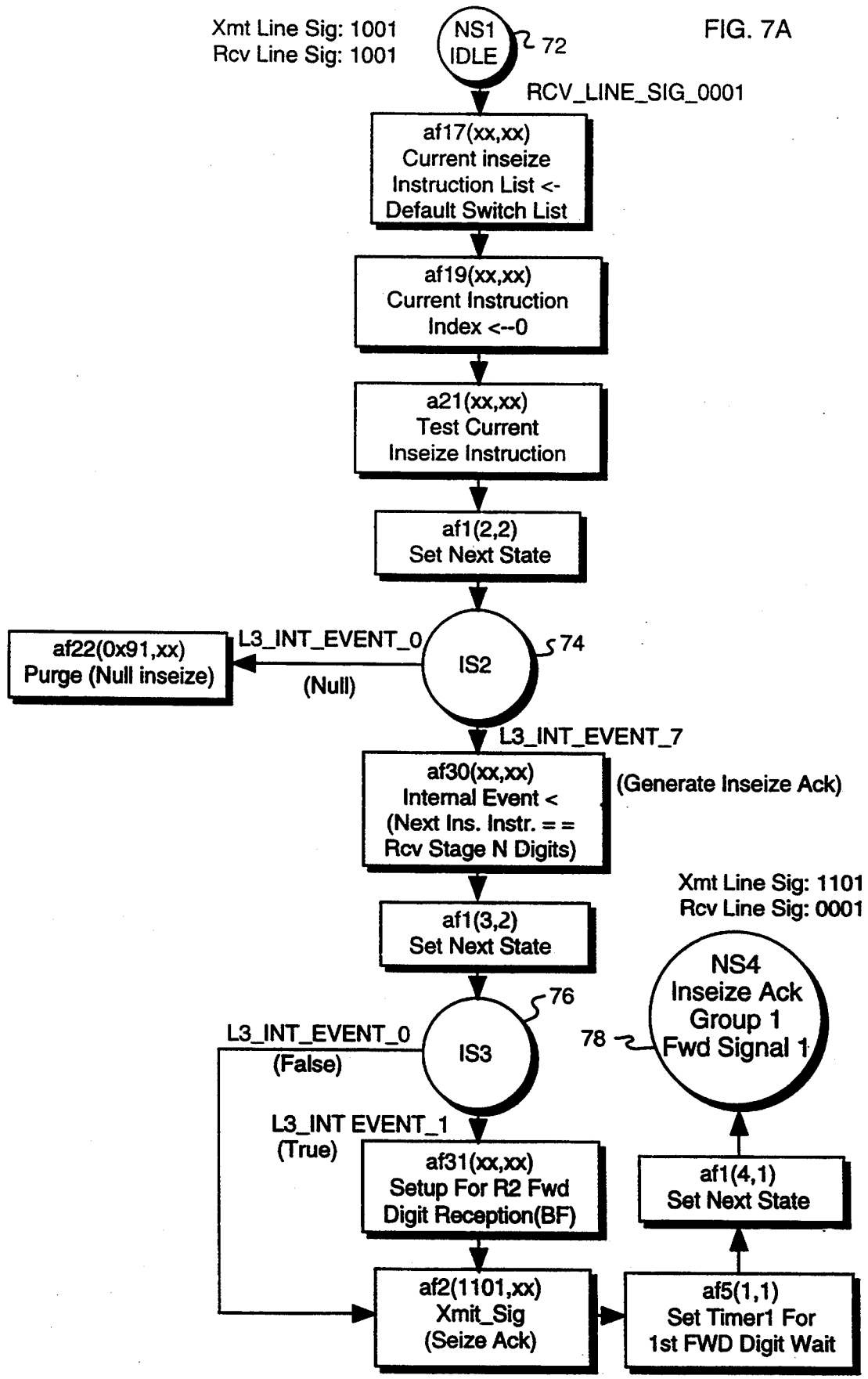
FIG. 7A is a state diagram of a finite state machine for processing the initial phase of call setup using international compelled R2 signalling in a layer 3 (network layer) application.
Figure 7B:
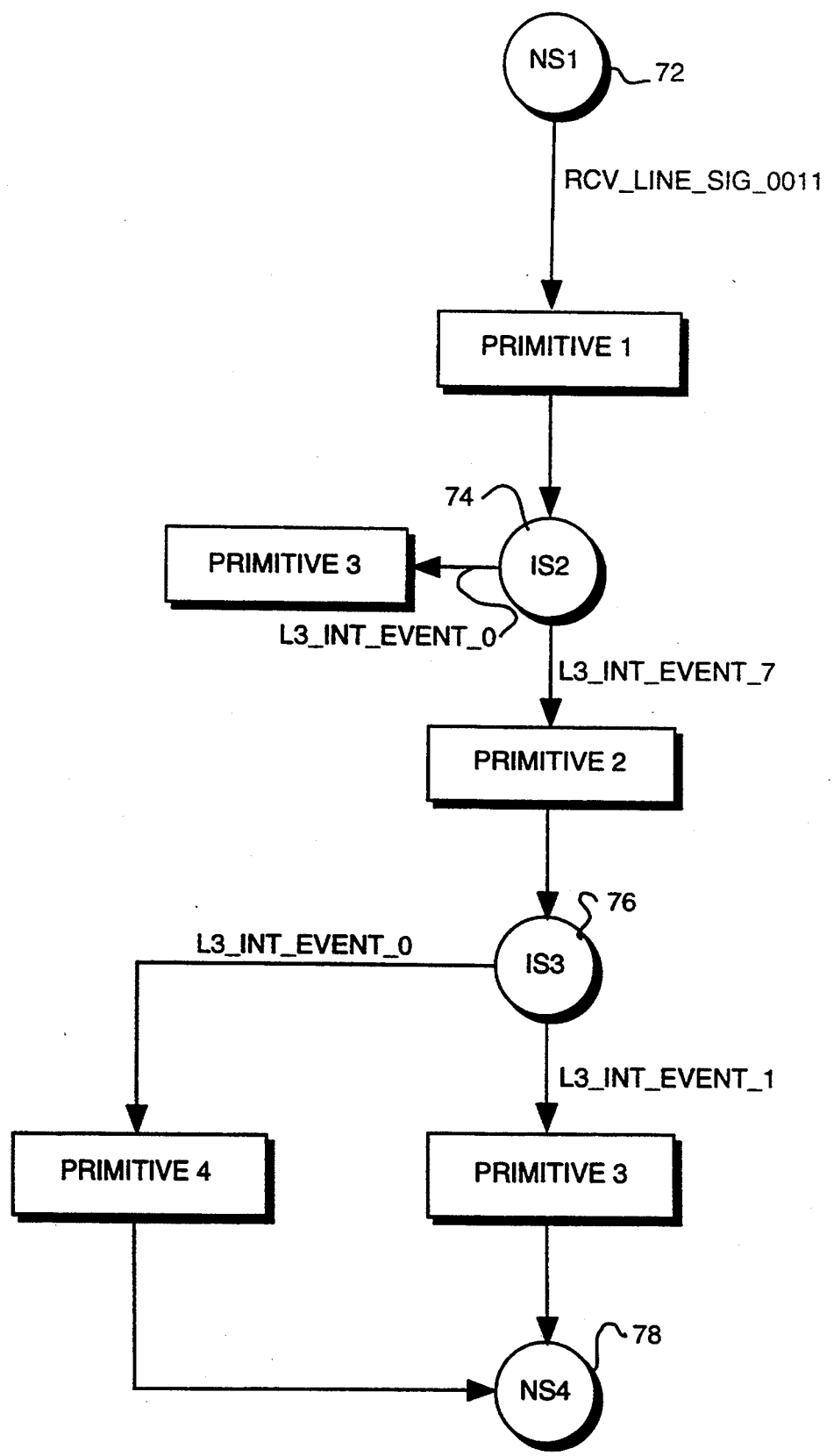
FIG. 7B is a diagram of the finite state machine of FIG. 7A in which each series of atomic functions is defined as a primitive.

FIG. 7A-7C are an example of the application of the present invention to a Network Protocol Layer 3 protocol for processing the initial phase of call setup using international compelled R2 signalling. The protocol begins with the associated channel in normal state 1 (NS1) 72, which is the IDLE state. Upon the occurrence of the event of receiving line signalling bits 0011 (which are the bit values that signal an inseizure), a series of atomic functions are performed (af17, af19, af21 and af1). Those atomic functions operate, respectively, to set the current inseize instruction list to the default switch list, set the current instruction index to 0, to test the current inseize instruction and then set the next state to internal state 2 (IS2) 74.

If the next event is a layer 3 internal event 0 (L3_INT_EVENT_0), which signifies that the current inseize instruction was tested and found to be null, then atomic function af22 is performed, which purges the channel. However, if the next event is a layer 3 internal event 7 (L3_INT_EVENT_7), which signifies that the current inseize instruction is to generate an inseize acknowlege, then atomic function af30 is performed which checks to see if the next inseize instruction is to receive stage N digits, followed by atomic function af1 which sets the next state to internal state 3 (IS3).

If the next event is L3_INT_EVENT_0 or FALSE, which signifies that the next inseize instruction is not to receive stage N digits, then the protocol proceeds to perform atomic function af2 (transmitting a seizure acknowledge having bit values 1101). If the next event is L3_INT_EVENT_1 or TRUE, atomic function 31 is performed which is a setup for R2 forward digit reception, followed by atomic function af2 (transmitting seizure acknowledge). Setup for digit reception typically involves allocation of a DSP resource found on a DSP card 16 (FIG. 1).

Next, atomic function af5 is performed, which sets a timer (timer1) to establish a waiting period for the expected first digit. This is followed by atomic function af1, which sets the next state to normal state 4 (NS4), which indicates that the inseizure has been acknowledged and that the channel is expecting to receive a Group 1 Forward MFR2 Signal.

Again, as shown in FIG. 7B, each sequence of atomic functions shown in FIG. 7A may be defined as a primitive (1-5). FIG. 7C shows the corresponding primitive table and state/event table for FIG. 7B.

Figure 8A:
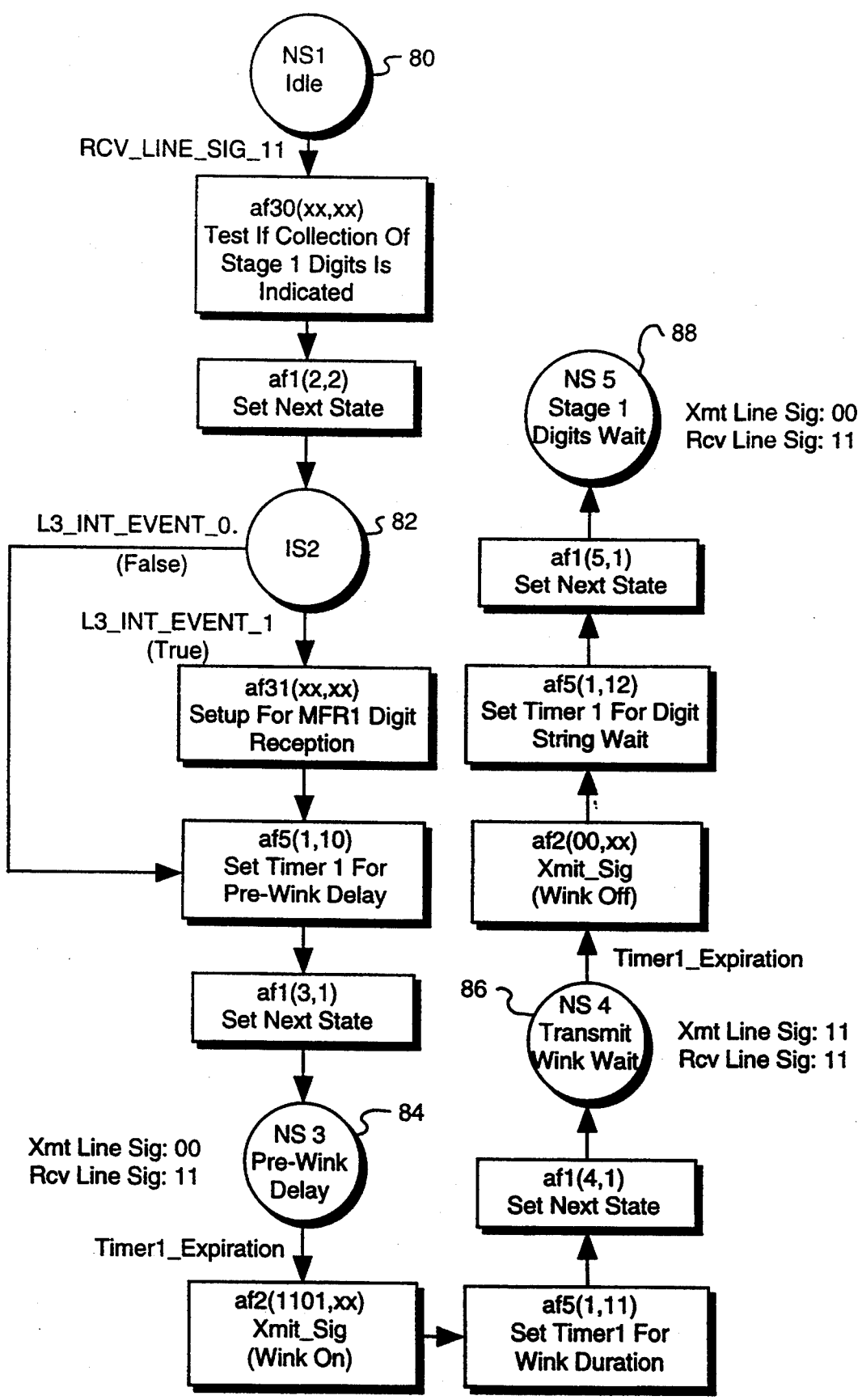
FIG. 8A is a state diagram of a finite state machine for processing the initial phase of call setup using T1 E&M wink start signalling in a layer 3 (network layer) application.

FIG. 8A is another example of an application of the present invention in Network Protocol Layer 3 protocol for processing the initial phase of call setup using T1E&M wink start signalling.

The protocol begins in a normal state (NS1) 80. Upon the receipt of bit values 11, which represent an inseizure, the atomic function af30 is performed, which tests whether collection of stage 1 digits is indicated. This is followed by atomic function af1, which sets the next state to internal state (IS2) 82.

If the next event is L3_INT_EVENT_0 or FALSE, meaning that digit collection is not indicated, then the protocol performs atomic function af5 (setting timer1 for a pre-wink delay), followed by af1 to set the next state to normal state (NS3) 84. If the next event is L3_INT_EVENT_1 or TRUE, meaning that digit collection is indicated, atomic function 31 is performed which is a setup for MFR1 digit reception, followed by af5 and af1.

Upon the expiration of timer1 (TIMER1_EXPIRATION), atomic function af2 is performed (wink on), followed by atomic functions af5 (setting a timer for the wink duration) and af1 to set the next state to normal state (NS4) 86. Again, upon the expiration of timer1, atomic function af2 is performed (wink off), followed by af5 (setting timer1 to wait for a digit string) and af1 to set the next state to normal state (NS5) 88.

Figure 8B:
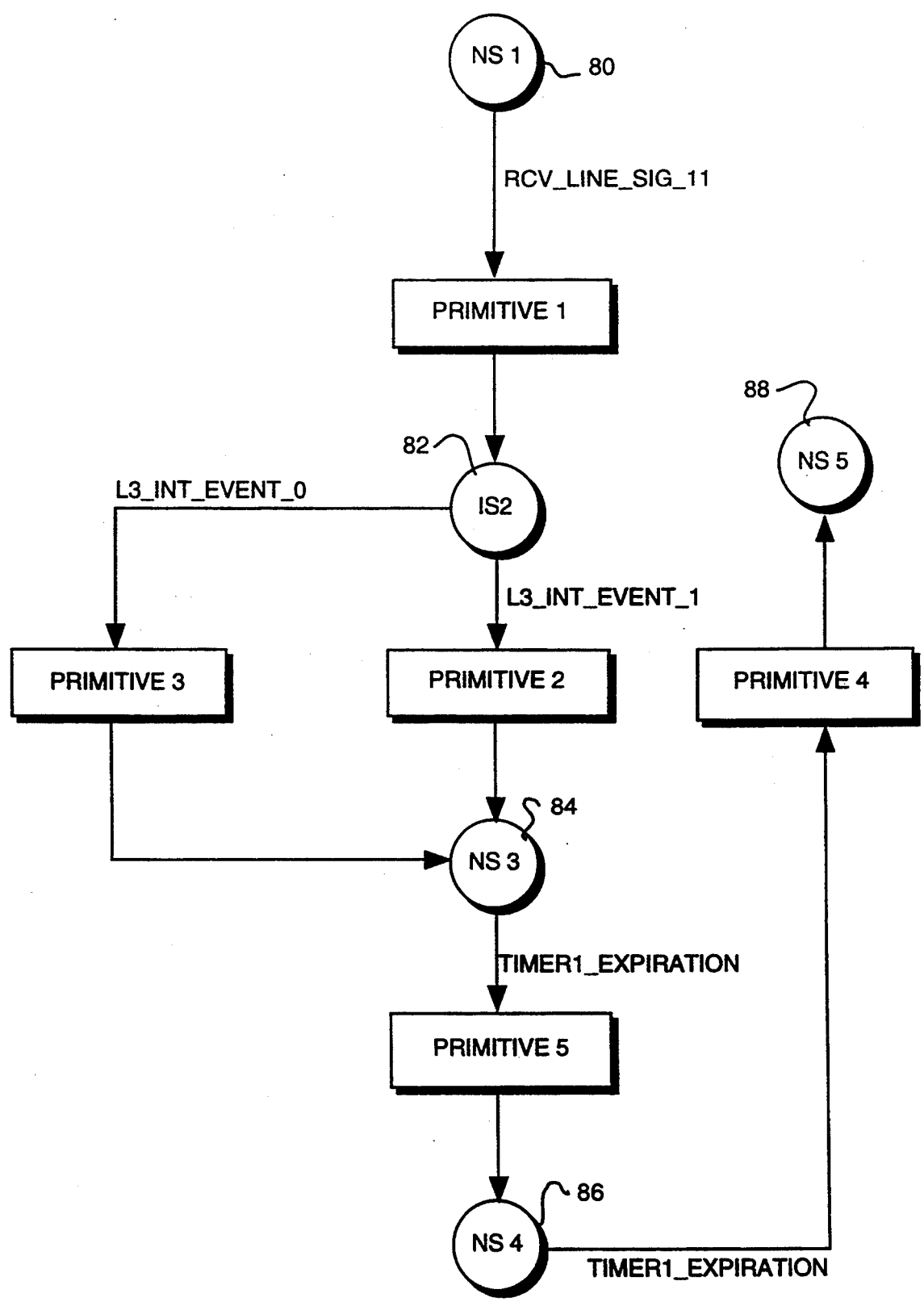
FIG. 8B is a diagram of the finite state machine of FIG. 8A in which each series of atomic functions is defined as a primitive.

FIG. 8B shows the correlation of between the atomic functions shown in FIG. 8A and primitives 1-5, and FIG. 8C shows the corresponding primitive table and state/event table by which a user or customer may define the described protocol.

Figure 9A:
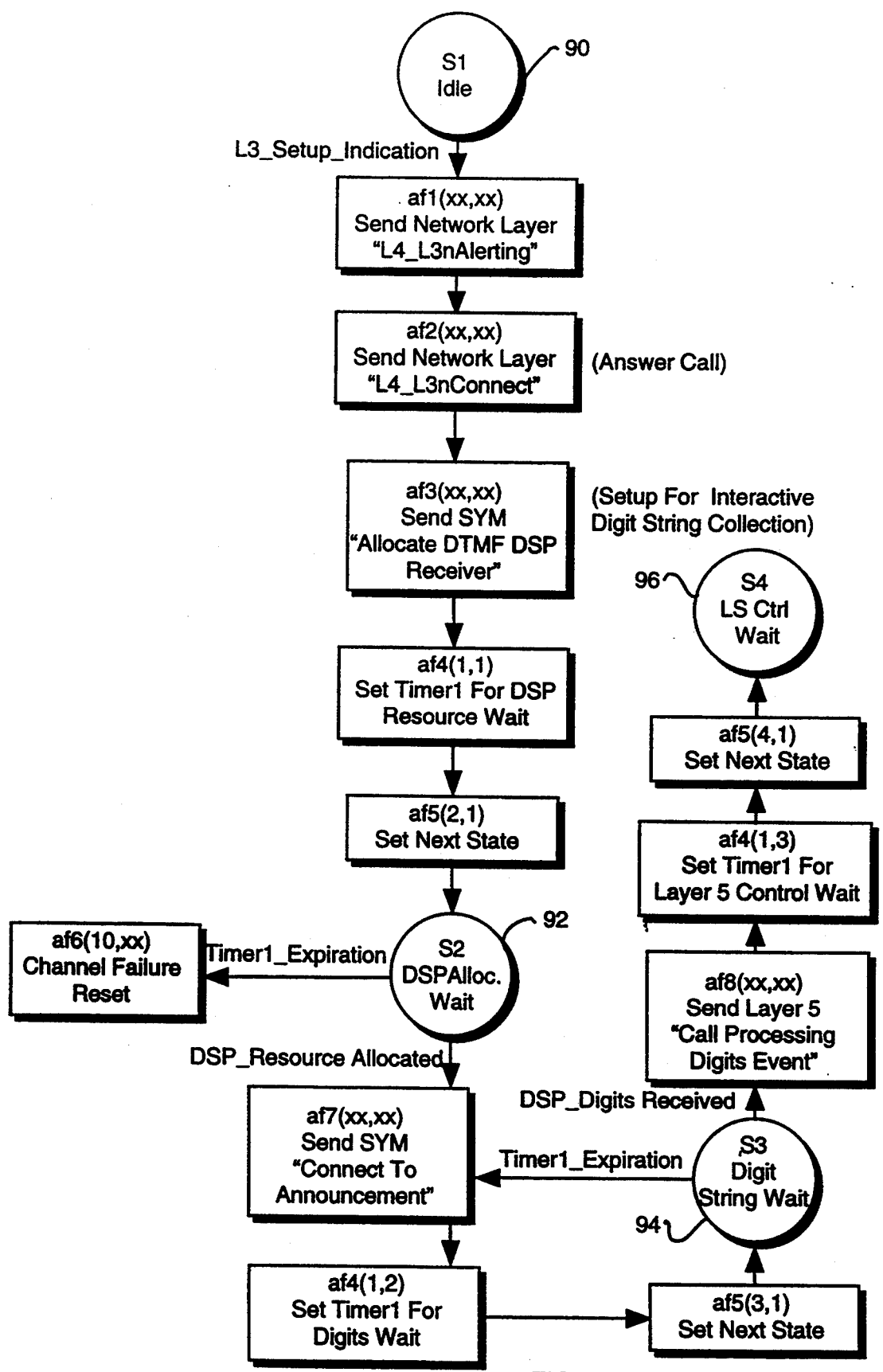
FIG. 9A is a state diagram of a finite state machine for providing interactive voice response to an incoming call in a layer 4 (call management layer) application.

FIG. 9A is an example of an application of the present invention in Call Processing Layer 4. In this example, the present invention is used to implement a protocol for providing interactive voice response (IVR) to an incoming call. The protocol begins in an IDLE state (S1) 90. Upon the receipt of a setup message (L3_SETUP_INDICATION), the atomic functions af1, af2, af3, af4 and af5 are performed. These atomic functions serve, respectively, to send an alerting message to Network Protocol Layer 3, to send a connect message (to answer the call) to Layer 3, to send a message to allocate a DSP resource for interactive digit string collection, to set timer1 to wait for allocation of the DSP resource and to set the next state to normal (wait) state (NS2) 92.

If the next event is the expiration of timer1 (TIMER1_EXPIRATION), atomic function af6 is performed to reset the channel. If the next event is receipt of a message indicating that the DSP resource was allocated, atomic function af7 is performed, which connects the caller to a desired announcement, followed by af4 which sets timer1 for digit wait, and af5 which sets the next state to normal state (S3) 94 to wait for digits.

If the next event is the expiration of timer1, the protocol again performs atomic function 7 (replays the announcement to the caller). If the next event is receipt of digits by the allocated DSP resource, the atomic functions af8 (informing Layer 5 that digits were received), af4 (setting timer1 to wait for instruction from Layer 5) and af5 (setting the next state to normal state (S4) 96.

Figure 9B:
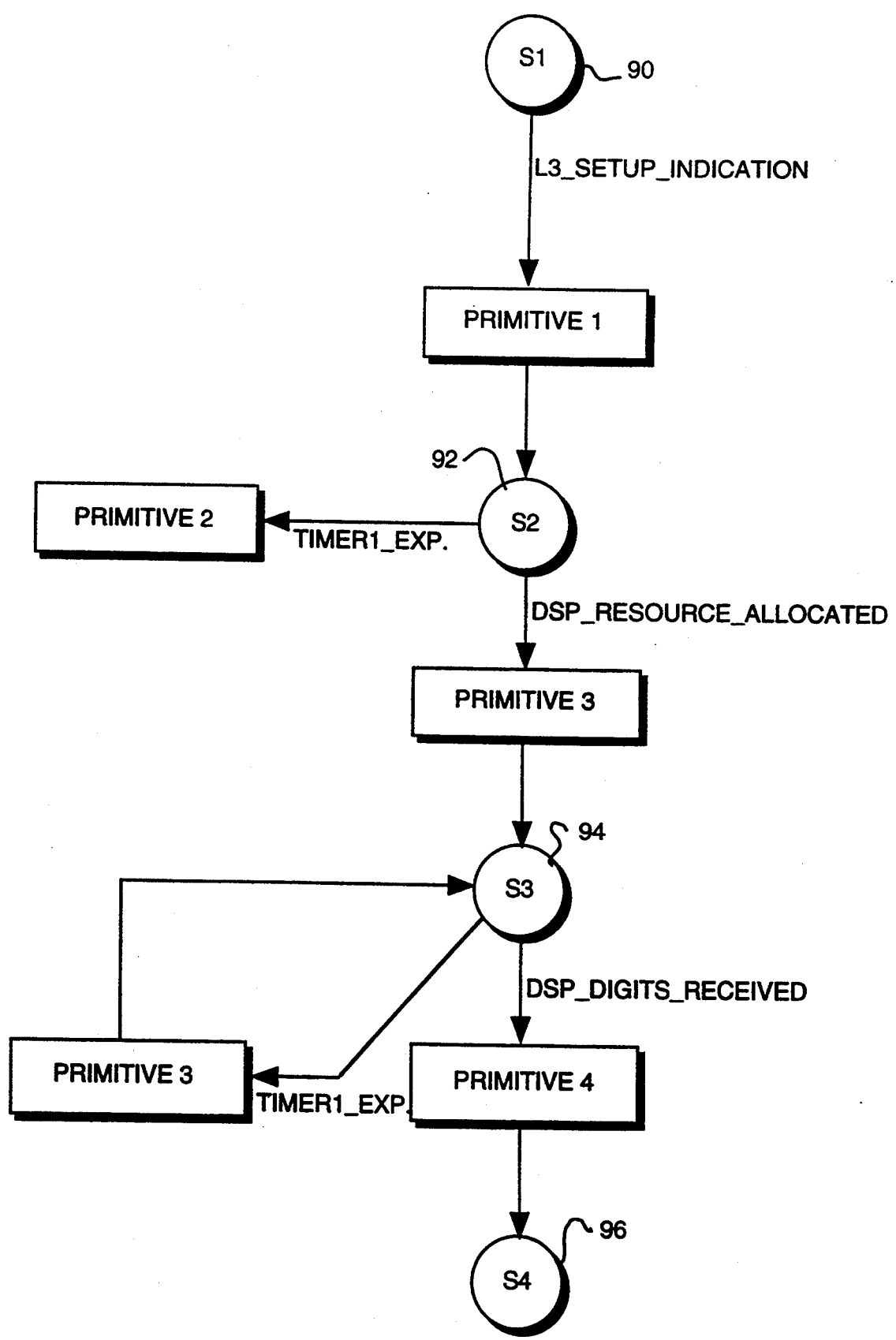
FIG. 9B is a diagram of the finite state machine of FIG. 9A in which each series of atomic functions is defined as a primitive.

Again, FIGS. 9B and 9C show the relationships between the states, events, atomic functions and primitives which define the IVR protocol of FIG. 9A.

Figure 10A:
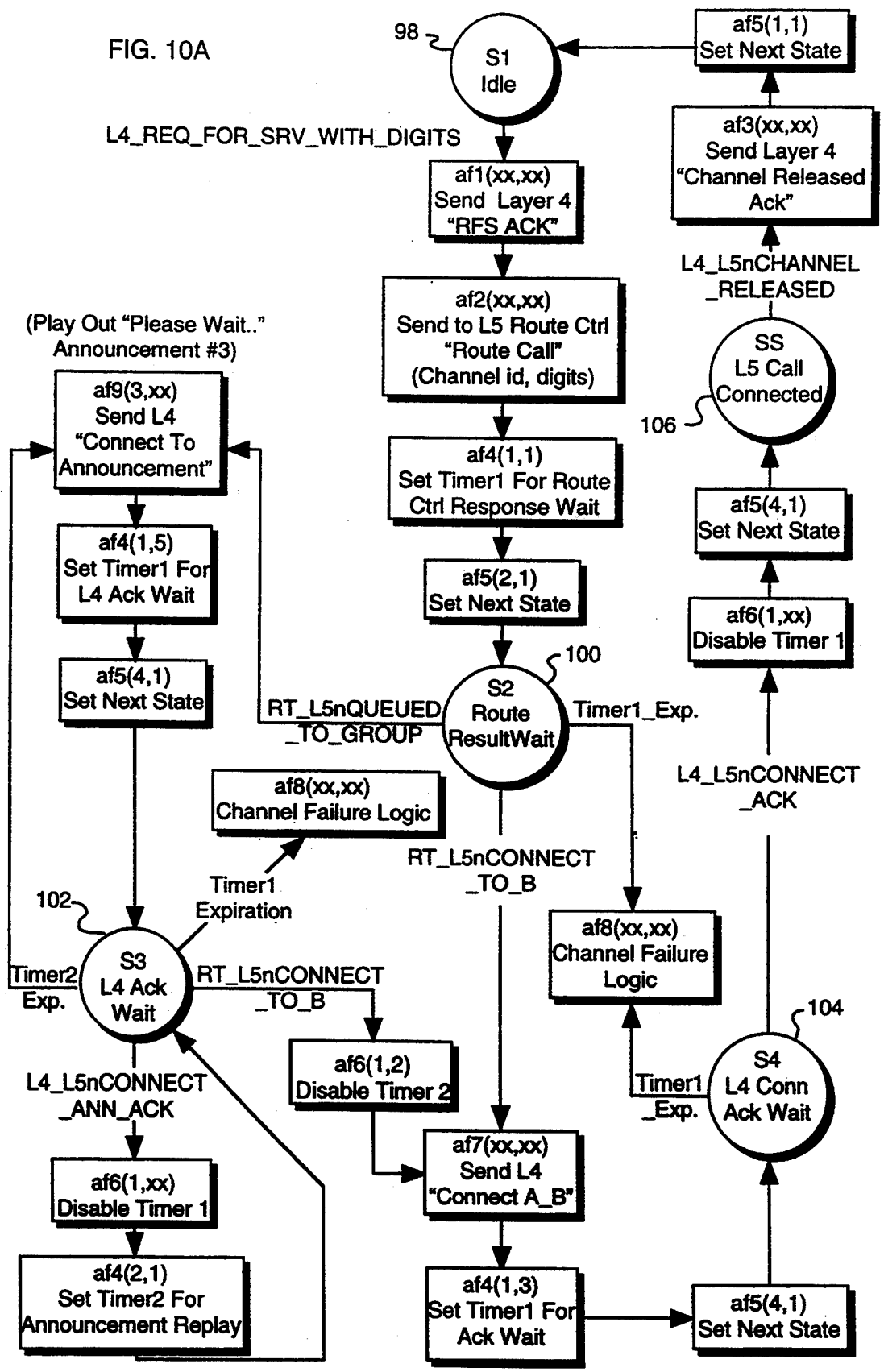
FIG. 10A is a state diagram of a finite state machine for a layer 5 inbound application such as toll free (800) service.

Finally, FIG. 10A is an example of an application of the present invention in the context of Application Layer 5. In this example, a protocol for an inbound application such as toll free (800) service is described.

The protocol begins in a normal state (S1) IDLE 98. Upon receipt of a request for service with digits message from Layer 4 (L4_REQ_FOR_SERV_WITH_DIGITS), atomic functions af1 (send an acknowledge message to Layer4), af2 (sending to Layer 5 Route Control (process) a message with a channel ID and digits), af4 (setting a timer to wait for a response from Layer 5 route control) and af5 (setting the next state to normal state (S2) 100) are performed.

In state (S2) 100, if the next event is the expiration of timer1, a channel failure has occurred and atomic function af8 is performed. If the next event is a message from Layer 5 route control to connect the channel which requested service, atomic function af7 is performed, which sends a message to Layer 4 to connect two channels. This is followed by af4, which sets a timer1 to wait for an acknowledgement that the connection was made, and then af5 which sets the next state to normal (wait) state (S4) 104.

In state (S4) 104, if the next event is expiration of timer1, a channel failure has occurred and atomic function af8 is performed. If the next event is a message from Layer 4 acknowledging that a connection was made (L4_L5n_CONNECT_ACK), atomic function af6 disables timer1, followed by af5 which sets the next state to normal state (S5) 106. Upon receipt of a message from Layer 4 indicating release of the channel, atomic function af3 is used to send an acknowledgement to Layer 4, followed by af5 which returns the channel to the IDLE state 98.

With reference again to state 100, if the next event is a message from Layer 5 route control to queue the incoming call to a group, atomic function af9 is performed, which connects the caller to a recorded announcement. This is followed by atomic function af4, which sets timer1 to wait for an acknowledgement from Layer 4, which is in turn followed by af5 to set the next state to normal state (S3) 102.

In state (S3) 102, if the next event is the expiration of timer 1, a channel failure has occurred and atomic function af8 is performed. If the next event is a message from Layer 4 acknowledging that a connection was made, af6 is performed to disable timer1 and af4 is performed to set timer2 for possible replay of the recorded announcement. Thus, if channel remains in state (S3) 102 long enough for timer2 to expire, the protocol will again perform af9 and replay the announcement.

If, however, in state (S3) 102 the next event is a message from Layer 5 route control to connect the channel which requested service, atomic function af6 is performed to disable timer2, followed by af7, which sends a message to Layer 4 to connect two channels. This is followed by af4, which sets a timer1 to wait for an acknowledgement that the connection was made, and then af5 which sets the next state to normal (wait) state (S4) 104.

Figure 10B:
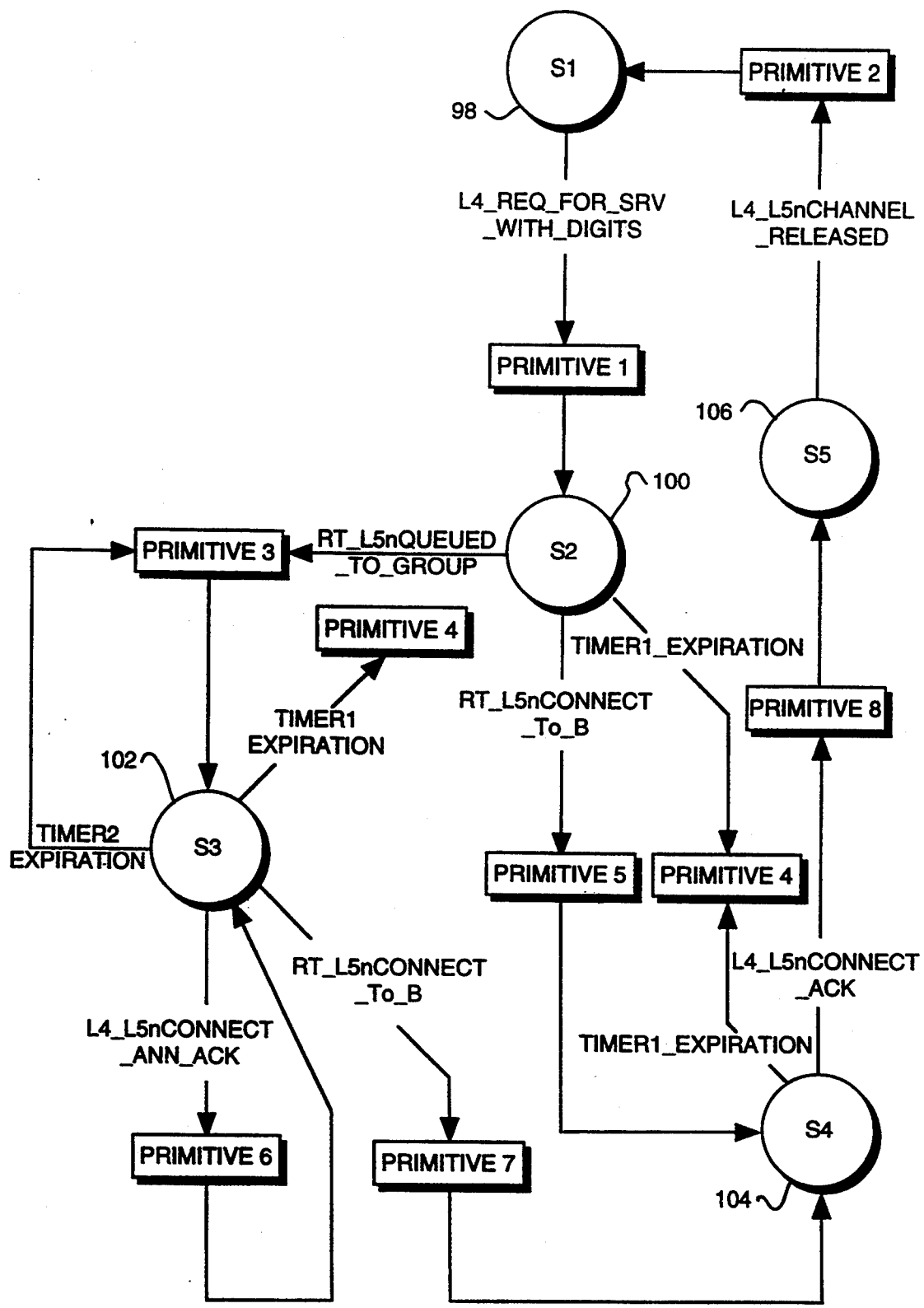
FIG. 10B is a diagram of the finite state machine of FIG. 10A in which each series of atomic functions is defined as a primitive.

FIGS. 10B and 10C show the relationships between the states, events, atomic functions and primitives which define the toll free service protocol of FIG. 10A.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method for operating a programmable telecommunication switch, said switch comprising controllable-switching means for dynamically connecting or disconnecting communication paths between various ones of a plurality of ports or channels in response to messages generated by a host device, said method comprising the steps of:

defining one or more protocols for processing incoming or outgoing calls, each of said protocols being represented by a finite state machine;

initially assigning at least one of said protocols to each of said ports or channels, whereby different protocols may be assigned to different ports or channels; and upon detection of an incoming call or origination of an outgoing call at one of said channels or ports, determining whether the protocol presently assigned to said one of said channels or ports is capable of processing said incoming or outgoing call and when said presently assigned protocol is incapable of processing said incoming or outgoing call, dynamically selecting another of said protocols which is capable of processing said incoming or outgoing call and using said selected protocol to process said incoming or outgoing call.

2. The method as in claim 1 wherein each of said finite state machines is represented by a state/event table in conjunction with a primitive table, said state/event table defining a plurality of predetermined logical states and at least one predetermined event associated with each such state, said primitive table defining one or more primitives each of which comprises a predetermined series of predetermined functions, whereby upon an occurrence of one of said predetermined events, a predetermined primitive associated with the occurring event is invoked.

3. The method as in claim 2 wherein one or more of said predetermined functions includes one or more user-programmable arguments.

4. The method as in claim 2 wherein each of said channels or ports is assigned a corresponding data block which includes information representing a current logical state and state type of the corresponding channel or port, a pointer to an active state/event table, a pointer to an active primitive table, a pointer to an assigned state/event table and a pointer to an assigned primitive table.

5. The method as in claim 4 wherein said finite state machines are interpreted by a state machine engine which operates in response to said pointers and a library which contains definitions of said predetermined functions.

6. The method as in claim 1 wherein one or more of said protocols is user-defined and downloaded for storage within said telecommunication switch.

7. The method as in claim 1 wherein one or more of said protocols is resident within said telecommunication switch.

8. A method for developing protocols for use with a programmable telecommunications switch, said switch comprising controllable-switching means for dynamically connecting or disconnecting communication paths between various ones of a plurality of channels or ports in response to messages generated by a host device, said method comprising the steps of:

creating one or more state/event tables each of which defines a plurality of predetermined logical states, at least one predetermined event being associated with each of said logical states, and a primitive being associated with each said event which is invoked upon an occurrence of the associated event;

creating one or more primitive tables each of which defines a predetermined series of predetermined functions for each said primitive;

creating one or more protocols each of which is represented by a predetermined combination of one of said state/event tables and one of said primitive tables, each of said protocols for processing incoming or outgoing calls;

storing said one or more protocols within said programmable telecommunications switch or said host device; and assigning at least one of said protocols to each of said channels or ports.

9. The method as in claim 8 wherein upon detection of an incoming call or origination of an outgoing call at one of said channels or ports, determining whether the protocol presently assigned to said one of said channels or ports is capable of processing said incoming or outgoing call, and when said presently assigned protocol is incapable of processing said incoming or outgoing call, dynamically selecting another one of said protocols which is capable of processing said incoming or outgoing call.

10. The method as in claim 8 wherein each of said channels or ports is assigned a corresponding data block which includes information representing a current logical state and state type of the corresponding channel or port, a pointer to an active state/event table, a pointer to an active primitive table, a pointer to an assigned state/event table and a pointer to an assigned primitive table.

11. The method as in claim 10 wherein each of said protocols is represented by a finite state machine which is interpreted by a state machine engine which operates in response to said pointers and a library which contains definitions of said predetermined functions.

12. The method as in claim 8 wherein one or more of said predetermined functions includes one or more user-programmable arguments.

13. A programmable telecommunications switch comprising:

controllable-switching means for dynamically connecting or disconnecting communication paths between various ones of a plurality of channels or ports in response to messages generated by a host device, including a time slot interchange for switching a plurality of time slots corresponding to said channels or ports and means for processing said messages;

one or more means connected in communicating relationship with said switching means for terminating either analog or digital lines or trunks, at least some of said lines or trunks representing some of said channels or ports; and means for storing one or more protocols in either said switch or said host device, each of said protocols for processing incoming or outgoing calls;

means for detecting incoming calls or origination of outgoing calls on any of said channels or ports and determining whether the protocols assigned to the channels or ports on which said calls are occurring are capable of processing said calls; and means, responsive to said detecting means, for dynamically selecting alternative protocols from among said stored protocols which are capable of processing said calls when said assigned protocols are incapable of processing such calls.

14. The switch as in claim 13 wherein one or more of said protocols is user-defined and downloaded to said switch for storage therein.

15. The switch as in claim 13 wherein one or more of said protocols is resident within said telecommunication switch.

16. The switch as in claim 13 wherein each of said protocols is represented by a finite state machine.

17. The switch as in claim 16 wherein said finite state machines are interpreted by one or more state machine engines which operate in response to said pointers and one or more libraries which contain definitions of said predetermined functions.

18. The switch as in claim 16 wherein each of said finite state machines is defined by a state/event table in conjunction with a primitive table, said state/event table defining a plurality of predetermined logical states and at least one predetermined event associated with each such state, said primitive table defining one or primitives each of which comprises a predetermined series of predetermined functions, whereby upon an occurrence of one of said predetermined events a predetermined primitive associated with the occurring event is invoked.

19. The switch as in claim 18 wherein one or more of said predetermined functions includes one or more user-programmable arguments.

20. The switch as in claim 13 including means for storing a corresponding data block for each of said channels or ports, each of said data blocks including information representing a current logical state and state type of the corresponding channel or port, a pointer to an active state/event table, a pointer to an active primitive table, a pointer to an assigned state/event table and a pointer to an assigned primitive table.

* * * * *